United States Patent [19]

Ohnishi

[11] Patent Number: 5,338,098

[45] Date of Patent: Aug. 16, 1994

[54] SEAT BACK OF AN AUTOMOTIVE SEAT

[75] Inventor: Yutaka Ohnishi, Ohme, Japan

[73] Assignee: Tachi-S Co., Ltd., Tokyo, Japan

[21] Appl. No.: 51,366

[22] Filed: Apr. 23, 1993

[51] Int. Cl.⁵ .............................................. A47C 31/02
[52] U.S. Cl. ..................................... 297/452.6; 5/402
[58] Field of Search .............. 297/452.60, 452.59, 297/452.62, 218; 5/402–407

[56] References Cited

U.S. PATENT DOCUMENTS

| | | | |
|---|---|---|---|
| 1,457,658 | 6/1923 | Green | 5/407 |
| 4,558,905 | 12/1985 | Natori | 297/452.60 |
| 4,718,718 | 1/1988 | Maruyama | 297/452.60 X |

FOREIGN PATENT DOCUMENTS 2030094  4/1971  Fed. Rep. of Germany ........................ 297/452.60
246796  12/1990  Japan.

Primary Examiner—Peter R. Brown
Attorney, Agent, or Firm—Browdy and Neimark

[57] ABSTRACT

A seat back for an automotive seat, wherein a trim cover assembly is affixed over a foam cushion member by means of an anchoring member fixed on the reverse side of the trim cover assembly, and there is provided an anchor securing element for pulling and securing the anchoring member onto the cushion member at an even pulling force, which comprises a rectilinear wire member and an elastic strap member connected thereto. The rectilinear wire member can easily be inserted into the anchoring member and be pulled by the elastic strp member to firmly secure the anchoring member to the cushion member.

8 Claims, 2 Drawing Sheets

FIG.1
PRIOR ART
FIG.2
PRIOR ART
FIG.3
PRIOR ART
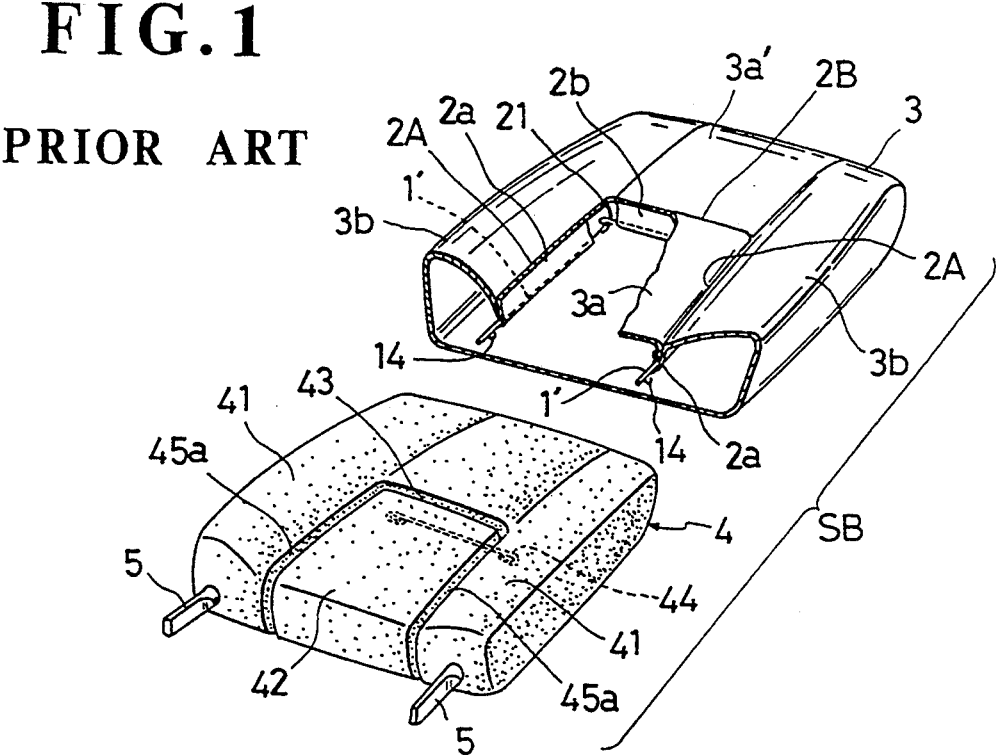
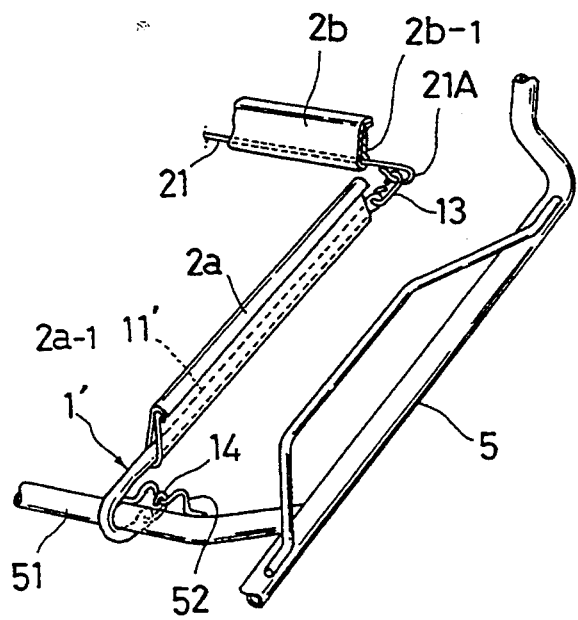
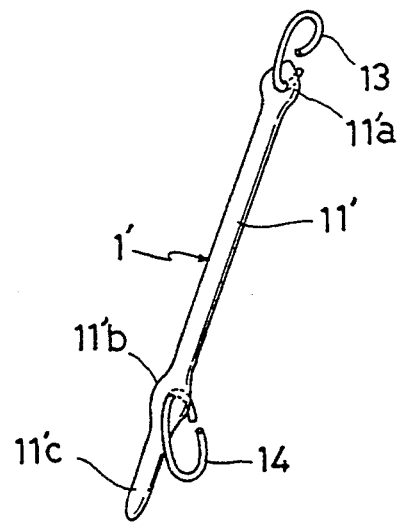

SEAT BACK OF AN AUTOMOTIVE SEAT

BACKGROUND OF THE INVENTION

1. Field of Invention

The present invention relates to a seat back of an automotive seat, and more particularly to a a seat back of such construction that its foam cushion member is formed to have a pair of lateral protrudent bolster portions, one integral bag-like body of trim cover assembly having an opened lower end is affixed over the cushion member, and the upper surface side of the trim cover assembly is partly pulled and anchored into the cushion member.

2. Description of Prior Art

Referring to FIGS. 1 to 3, an ordinary seat back (SB) is comprised of a foam cushion member (4) with a seat back frame (5) embedded therein, and a trim cover assembly (3) of a bag-like type preformed into one integral body having one opened lower end.

The foam cushion member (4) is so formed as to have a pair of lateral protrudent bolster portions (41)(41), a flat central portion (42) and a recessed groove of generally inverted-U-shaped configuration which is defined in a lower part of the central portion (42). As shown, the recessed groove comprises a pair of vertical groove portions (45a)(45a) extending in and along the respective boundary lines between the lateral bolster portions (41)(41) and the central seating portion (42), and a horizontal groove portion (43) extending width-wise of and transversely of the cushion member (4).

Designation (44) denotes an insert wire which is embedded in the cushion member (4) such as to be disposed at the bottom of the foregoing horizontal groove portion (43).

The trim cover assembly (3) is formed in one integral body like a bag with one opening, so dimensioned to allow insertion of the above-described cushion member (4) thereinto, to thereby constitute such a seat back as shown in FIGS. 5 and 6, although not shown clearly in FIGS. 1 to 3. The trim cover assembly (3) has, defined therein, a pair of lateral bolster cover sections (3b)(3b), each being for covering the respective two lateral bolster portions (41) (41) of cushion member (4), a lower central cover section (3a) for covering the corresponding portion (42) of cushion member (4), and an upper central cover section (3a') for covering the upper central portion of cushion member (4), all of which are sewn together as shown.

In this sort of trim cover assembly, there are provided three anchoring members (2a), (2a) and (2b) to pull and anchor the frontal surface of the trim cover assembly into the cushion member (4) for firm securement thereupon. Each of those three anchoring members is formed from an elongated strip of cloth or the like, having a lower through-opening (2a-1) of a loop-like shape in section, as can be understood from FIG. 2.

Of the three achoring members, the two ones (2a)(2a) form a pair of height-wise anchoring members which are sewn to the left-side boundary between the corresponding left-side bolster portion (3b) and end of central cover section (3a), and the right-side boundary between the corresponding right-side bolster portion (3b) and end of central cover section (3a), respectively, as viewed from FIG. 1. Such two anchoring members (2a)(2a) are dependent from the reverse side of the trim cover assembly (3) and extend in the height-wise direction of the same (3). Another remaining one (2b) form a width-wise anchoring member which is sewn to the horizontal boundary between the upper end of upper central cover section (3a') and a lower end of lower one (3a), and extends in the width-wise direction of the trim cover assembly (3), dependent from the reverse side thereof. A width-wise securing wire (21) is inserted in the through-opening (2b-1) of that width-wise anchoring member (2b).

FIG. 3 shows a conventional anchor securing strap (1') for use in each of the above-stated two height-wise anchoring members. (2a)(2a). The securing strap (1') is made of a rubber material on the whole, comprising a body portion (11'), one connecting end (11'a), another connecting end (11'b) and a a pull tab portion (11'c). Two hook-like latch elements (13)(14) of generally "C" shape are provided on both connecting ends (11'a)(11'b) of securing strap (1'), respectively. The anchor securing strap (1') is inserted in each of the two height-wise anchoring members (2a)(2a) and retained therein with the latch element (13) being connected to the end (21A) of the securing wire (21). With this state, the trim cover assembly (3) is affixed over the cushion member (4), with a care being paid to insure that the width-wise anchoring member (2b) and two height-wise anchoring member (2a)(2a) are respectively inserted into the horizontal groove portion (43) and two vertical groove portions (45a)(4a) and thereafter the width-wise anchoring member (2b). is connected to the insert wire (44) by means of hog rings (not shown), and the pull tab portion (11'c) is pulled along the longitudinal direction of the height-wise recessed groove (45a), as can be seen from FIGS. 2 and 6, although the FIG. 6 is not related to this prior-art structure, so that the connecting end (11'b) is secured to the horizontal frame (51) of the seat back frame (5) by engaging latchingly the latch element (14) over the female latch member (52) fixed on that horizontal frame (51). As a result, the two height-wise anchoring members (2a)(2a) are forcibly pulled down and expanded vertically in the respective two vertical recessed grooves (45a)(45a) along the longitudinal direction, by the elastic stretching force of the two securing straps (1')(1'). Thus, the frontal surface of trim cover assembly (3) is stretched over that of cushion member (4) to avoid slacked portion thereupon.

However, the employment of the rubber anchor securing straps (1')(1') has been found defective in that (i) the straps per se can not easily be inserted through the through openings (2a-1)(2a-1) of anchoring members (2a)(2a), respectively, due to their elasticity, which may require a guide wire or the like to facilitate the insertion of the straps. In comparison, the prior art rubber strap (1') results in an uneven pulling force on the anchoring member creating an undesirable creasing and wrinkling on the surface of the trim cover assembly over the seat back.

SUMMARY OF THE INVENTION

In view of the above-stated drawbacks, it is therefore a purpose of the present invention to provide an improved structure of a seat back that permits easy insertion of a anchor securing means into the height-wise anchoring member fixed on the reverse side of trim cover assembly covering a cushion member of the seat back.

To achieve such purpose, in accordance with the present invention, there is provided a anchor securing means for pulling and securing the height-wise anchoring member to the seat cushion, which anchor securing means comprising a rectilinear wire member and an elastic, expandable strap member connected to one end of the rectilinear wire member, another end of which is provided with a hook-like latch means, the strap member being also provided with a hook-like latch means. The rectilinear wire member can easily be inserted, due to its rigidity, in the height-wise anchoring member, with the hook-like latch means of the wired member projecting from one end of the anchoring member and with the strap member projecting from another end of the same. The thus-projected hook-like latch means of wire member is engaged securely to a securing part of the cushion member, while the strap member thus projected is extended elastically to engage the hook-like latch means thereof to another securing part of cushion member, thereby applying a pulling force to the anchoring member in the height-wise direction thereof and thus anchoring the trim cover assembly firmly to the cushion member.

Preferably, the rectilinear wire member should have a length generally equal to an entire length of the height-wise anchoring member. The length of the wire member may be slightly shorter than the entire length of the height-wise anchoring member. This allows for tolerably absorbing any slight difference in length of the rectilinear wire member used.

Accordingly, the corresponding surface of the trim cover assembly is evenly pulled and stretched onto the cushion member.

In one aspect of the present invention, the strap member may be formed to have, defined therein, an expandable body connected too the wire member, and a pull tab portion, in order to improve its handling property.

BRIEF DESCRIPTION OF THE DRAWINGS

FIG. 1 is a partly broken, schematic perspective view of a conventional seat back comprising a cushion member and a trim cover assembly, with a conventional anchoring member provided on the trim cover assembly;

FIG. 2 is a partly broken, schematic perspective view showing the state where the conventional anchoring member is used;

FIG. 3 is a perspective view of a conventional anchor securing element to be inserted into the anchoring member;

DETAILED DESCRIPTION OF PREFERRED EMBODIMENT OF THE INVENTION

Figure 4:
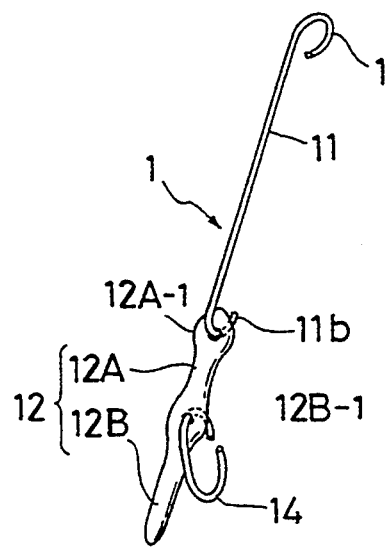
FIG. 4 is a perspective view of an anchor securing element according to the present invention.
Figure 5:
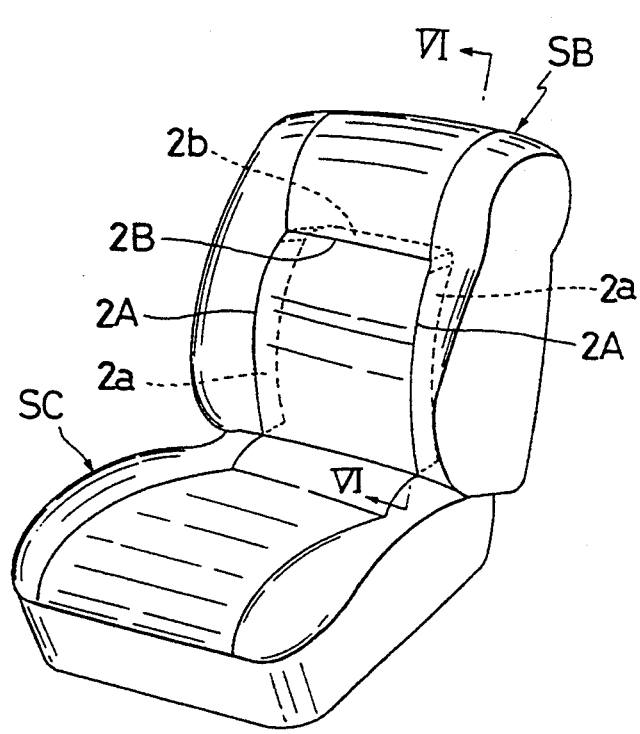
FIG. 5 is a schematic perspective view of an automotive seat to which the present invention is applied.
Figure 6:
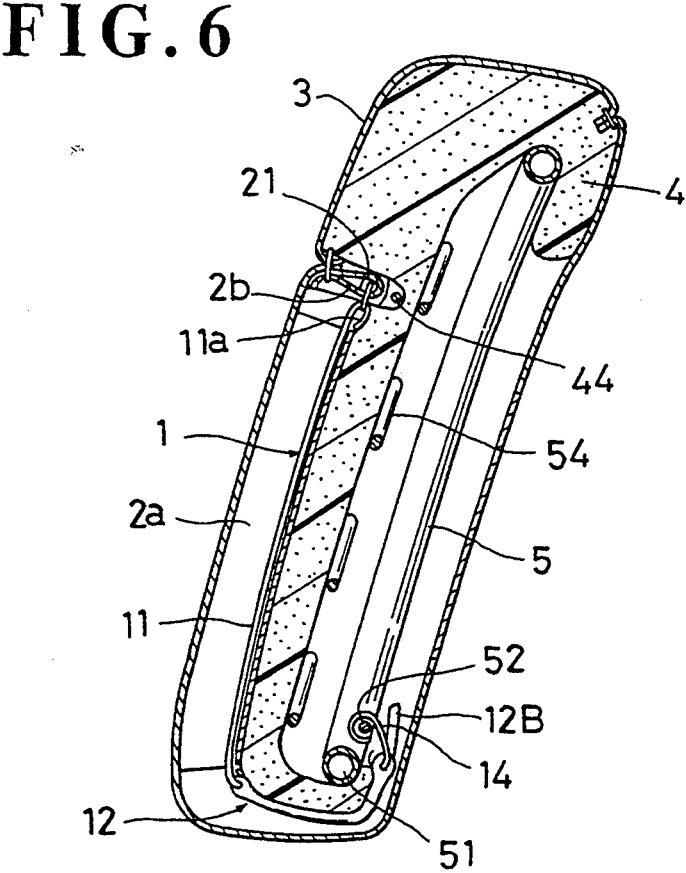
FIG. 6 is a sectional view taken along the line VI—VI in the FIGURE.

Referring to FIGS. 4 through 6, there is shown one preferred embodiment of the present invention.

It should be understood, at first, that the invention is an improvement based on the above-described prior art, using most of its structural members and elements. Therefore, all like designations in the prior art description correspond to all like designations to be given hereinafter, and any specific explanation is deleted on the common members and elements between the prior art and present invention.

FIG. 4 shows an anchor securing element (1) which forms a novel, principal portion of the present invention. The anchor securing element (1) is comprised of a wire member (11) and a rubber elastic strap member (12).

The wire member (11) is formed, at its both end, with two hook-like connecting parts (11a)(11b), respectively. This wire member (11) is made of a rigid steel material in the rectilinear form, having a length generally equal to or slightly shorter than the entire length of the height-wise anchoring member (2a).

The strap member (12) has, defined therein, a connecting end (12A-1), an expandable body (12A), a connecting area (12B-1), and a pull tab portion (12B).

As shown, the hook-like connecting part (11b) of wire member (11) is penetrated through the connecting end (12A-1) of strap member (1) and the hooklike latch element (14) is also penetrated through the connecting area (12B-1) of strap member (1).

The above-constructed anchor securing element (1) is adapted for pulling and securing firmly the height-wise anchoring member (2a) into and along the height-wise recessed groove (45a), with reference being made again to FIGS. 1 and 2, as similar to the prior-art elastic securing one (1').

But, according to the present invention, when using the anchor securing element (1) in the height-wise anchoring member (2a), the wire member (11) is firstly inserted into the lower through-opening (2a-1) of the anchoring member (2a) and retained therein, with the free connecting part (11a) being connected to the end (21A) of the width-wise securing wire (21), while the strap member (12) projecting from the forward end of anchoring member (2a). Then, a worker assembling the seat back (SB) pulls, with his or her hand, the pull tab portion (12B) of strap member (12), so that the body (12A) of strap member (12) is extended elastically and turned over the lower end of cushion member (4), as can be seen from FIG. 6. Finally, the catch element (14) is engaged over the female latch element (51) of the seat back frame (5), with the result that the frontal surfaces (at 3a, 3a') of trim cover assembly (3) are evenly stretched over the corresponding surface (at 42) of cushion member (4).

It is noted that, in the case of the wire member (11) being equal in length to the height-wise anchoring member (2a), naturally the whole body of strap member (12) projects from the free end of height-wise anchoring member (2a), whereas by contrast in the case of the wire member (11) being shorter than the entire length of height-wise anchoring member (2a), a part of the strap member (12) resides within the anchoring member (2a), not projecting the whole body of strap member (12). This means to tolerably absorb a slight difference in length of the wire member used, and does not affect the undermentioned features of the present invention.

The anchor securing element (1) in accordance with the present invention is advantageous in that (i) the rigid wire member (11) can easily be inserted through the anchoring member (2a) with more quickness, as compared with the conventional anchor securing strap (1'), which makes more rapid the assemblage of seat, and (ii) the anchoring member (2a) is pulled evenly by such long rigid wire member (11) toward the cushion member (4), thus applying a pulling force uniformally along the full longitudinal axis of the anchoring member, so that all the upper central cover section (3a'), lower central cover section (3b') and a pair of bolster cover sections (3b)(3b), of the trim cover assemlby (3), are neatly affixed over the corresponding surface portions of cushion member (4), without any local excessive pulling forces created thereon. Thus, there is eliminated the undesired crease or wrinkle problem in the trim cover assembly as found in the prior art.

The present invention is not limited to the illustrated embodiment, but any other modifications, replacements and additions may be applied thereto without departing from the scope and spirit of the appended claims.

What is claimed is:

1. In a seat back of an automotive seat including a foam cushion member having a seat back frame embedded therein and having formed, at the frontal surface thereof, a pair of lateral protrudent bolster portions and a central portion defined therebetween, a trim cover assembly of a bag-like type which is affixed over said foam cushion member and has a frontal cover section for covering both said central and two lateral bolster portions of said cushion member, an anchoring member fixed on a reverse side of said frontal cover section along a height of said trim cover assembly, said anchoring member having a through opening formed at a lower end and extending along a longitudinal direction thereof, and an anchor securing means for pulling and securing said anchoring member to said cushion member, said anchoring securing means comprising:
a rigid rectilinear wire member having a length generally equal to an entire length of said anchoring member, said rigid rectilinear wire member being provided at one end thereof with a first hook-like engagement means; and
an elastic, expandable strap member connected to another end of said rectilinear wire member, said strap member being provided with a second hook-like engagement means;
wherein when said rigid rectilinear wire member is inserted through said through-opening of said anchoring member, said first hook-like engagement means of the wire member projects from one end of said anchoring member while said another end engages said strap member wherein the projecting first hook-like engagement means of said wire member is engaged securely with a securing part of said cushion member, while said second hook-like engagement means of said strap member is securely engaged with another securing part of said cushion member, with said strap member being elastically expanded, whereby a pulling force is applied uniformly on said anchoring member along said height of the seat back and thus said trim cover assembly is firmly anchored to said cushion member, forming the seat back.

2. The seat back according to claim 1, wherein said rigid rectilinear wire member is integrally formed with said first hook-like engagement means.

3. The seat back according to claim 1, wherein said strap member is so formed as to have, defined therein, an expandable body connected to said wire member, and a pull tab portion.

4. The seat back according to claim 1 wherein said rigid rectilinear wire member is made from a metal.

5. In a seat back of an automotive seat including a foam cushion member having a seat back frame embedded therein and having formed, at the frontal surface thereof, a pair of lateral protrudent bolster portions and a central portion defined therebetween, a trim cover assembly of a bag-like type which is affixed over said foam cushion member and has a frontal cover section for covering both said central and two lateral bolster portions of said cushion member, an anchoring member fixed on a reverse side of said frontal cover section along a height of said trim cover assembly, said anchoring member having a through opening formed at a lower end and extending along a longitudinal direction thereof, and an anchor securing means for pulling and securing said anchoring member to said cushion member, said anchoring securing means comprising:
a rigid rectilinear wire member having a length slightly shorter than an entire length of said anchoring member, said rigid rectilinear wire member being provided at one end thereof with a first hook-like engagement means; and
an elastic, expandable strap member connected to another end of said rigid rectilinear wire member, said strap member being provided with a second hook-like engagement means;
wherein when said rigid rectilinear wire member is inserted through said through-opening of said anchoring member, said first hook-like engagement means of the wire member projects from one end of said anchoring member while said another end engages said strap member wherein the projecting first hook-like engagement means of said wire member is engaged securely with a securing part of said cushion member, while said second hook-like engagement means of said strap member is securely engaged with another securing part of said cushion member, with said strap member being elastically expanded, whereby a pulling force is applied uniformly to said anchoring member along said height of the seat back and thus said trim cover assembly is firmly anchored to said cushion member, forming the seat back.

6. The seat back according to claim 5, wherein said rigid rectilinear wire member is integrally formed with said first hook-like engagement means.

7. The seat back according to claim 5, wherein said strap member is so formed as to have, defined therein, an expandable body connected to said wire member, and a pull tab portion.

8. The seat back according to claim 5 wherein said rigid. rectilinear wire member is made from a metal.

* * * * *